No. 653,137. Patented July 3, 1900.
P. FEITEN.
FAT SEPARATING MACHINE.
(Application filed June 6, 1899.)
(No Model.) 2 Sheets—Sheet 1.
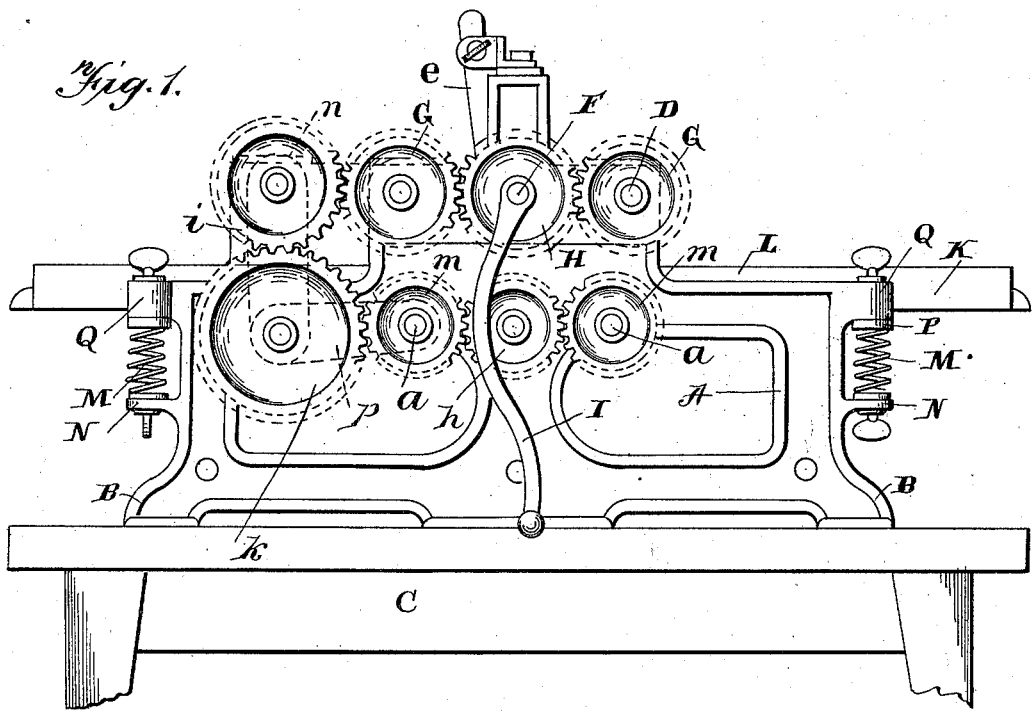
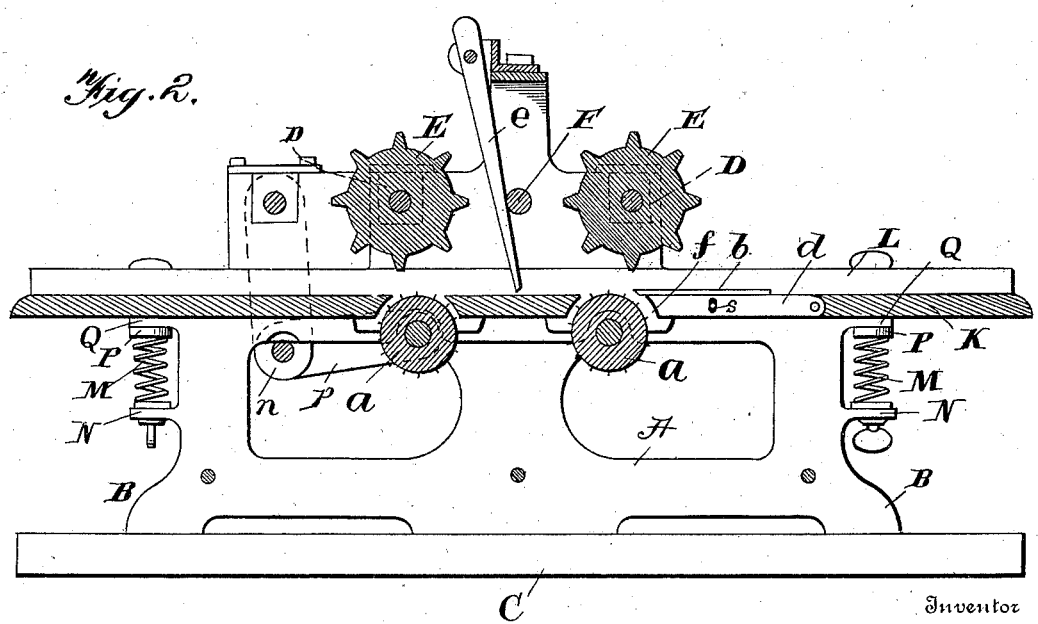
Witnesses
Geo. E. Finch
Chas. R. Wright Jr.
Inventor
Phillip Feiten,
by A. S. Pattison,
Attorney No. 653,137. P. FEITEN. Patented July 3, 1900.
FAT SEPARATING MACHINE.
(Application filed June 6, 1899.)
(No Model.) 2 Sheets—Sheet 2.
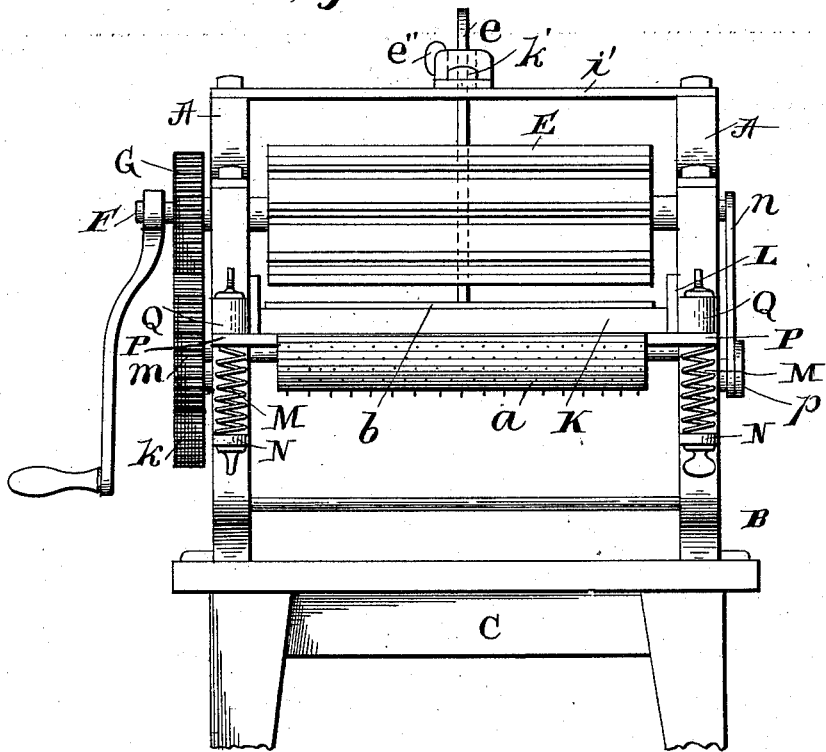
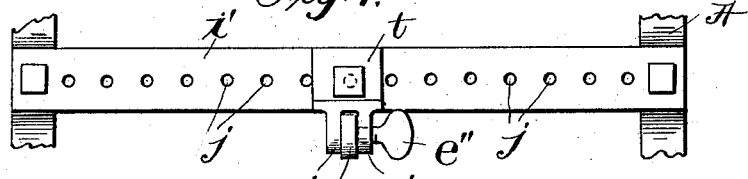
Witnesses
Geo. E. Frech.
Chas. R. Wright Jr.
Inventor
Phillip Feiten,
by A. J. Pattison
Attorney

UNITED STATES PATENT OFFICE.

PHILLIP FEITEN, OF CLEVELAND, OHIO, ASSIGNOR OF FIVE-SIXTHS TO GEORGE E. MITTINGER, JR., OF SAME PLACE.

FAT-SEPARATING MACHINE.

SPECIFICATION forming part of Letters Patent No. 653,137, dated July 3, 1900.

Application filed June 6, 1899. Serial No. 719,588. (No model.)

*To all whom it may concern:*

Be it known that I, PHILLIP FEITEN, a citizen of the United States, residing at Cleveland, in the county of Cuyahoga and State of Ohio, have invented a new and useful Improvement in Fat-Separating Machines, of which the following is a full, clear, and exact description, reference being had to the accompanying drawings.

My invention relates to improvements in fat-separating machines, and pertains to a machine which is adapted to cut or separate the pure fat from the skins of hogs, all of which will be more fully described hereinafter.

Heretofore fat has been separated from the skin of hogs in packing-houses by cutting the pure fat with the skin attached from the sides, back, and belly of hogs in strips of from eight to fourteen inches wide, according to the size of the hog, and from one and one-half to three inches thick. Irregular pieces of skin with the pure fat attached are also cut from other parts of the animal which contain the pure fat, and these are then cut by hand into strips about two and one-half inches wide by one workman or series of workmen and then passed along to other workmen, who separate the fat from the skin with an ordinary butcher's knife, care being necessary to leave as little of the fat as possible upon the skin without cutting the latter, as the fat is largely used for butterine purposes.

The object of my invention is to provide a machine for accomplishing what has heretofore been accomplished by hand.

In the accompanying drawings, Figure 1 is a side elevation of a machine embodying my invention. Fig. 2 is a central longitudinal vertical sectional view of the same. Fig. 3 is an end elevation looking in the direction indicated in Fig. 1. Fig. 4 is a top plan view of the top bar $i$, showing the manner of adjusting the vertically-arranged knife. Fig. 5 is a vertical sectional view taken upon the line 6 6 of Fig. 2.

Referring now to the drawings, A indicates the frame of a machine, which may be of any desired form, and this frame is provided with suitable supporting-legs B, which are screwed or otherwise attached to a table or other support C. Projecting from the frame A are roller-bearings D, which support the two parallel separated corrugated rollers E, and passing between these rollers and out of contact therewith is an operating-shaft F. Attached to one end of these rollers D are the cog-wheels G, and carried by the operating-shaft F, between and meshing with the cog-wheels G, is a gear or cog wheel H. An operating crank shaft or handle I is attached to the driving-shaft F for rotating it, and in turn the corrugated rollers E, though a pulley or other means for operating the driving-shaft, may be substituted for the crank, as will be readily understood.

Situated beneath the corrugated rollers and between the sides of the frame A is a spring-supported table K, having longitudinal upwardly-extending guiding-flanges L. This table K is supported through the medium of coil or other forms of springs M, having one of their ends supported upon laterally-projecting ears N of the frame A and their upper ends engaging similarly-projecting ears P, formed upon the spring-supported table K, and these ears P engage the under side of projections or ears Q, extending from the frame A, and which projections Q limit the upward movement of the table A, but permit it to be pressed downward.

Supported by and journaled to the under side of the spring-supported table K are two parallel feeding-rollers $a$, which are situated directly under the corrugated rollers E, and these rollers $a$ are provided with pins projecting from their periphery, which pins are adapted to pass into the skin and feed it along through the machine. The lower series of rollers $a$ are provided with cogs attached to them, and situated between these cogs is an idler-gear $h$. At one end of the frame and intermeshing with one of the gears G upon the upper rollers is an idler-gear $i$, and situated below and intermeshing with this idler-gear is a second and larger idler-gear $k$, the latter meshing with one of the gears or cog-wheels $m$, carried upon one end of the lower rollers $a$. For the purpose of causing these rollers to properly mesh at all points when the table is depressed I have the idler-gear $k$ movable and journaled upon links $n$, which have their upper ends journaled or pivoted to the shaft or journal of the idler $i$, and this idler $k$ is in turn again connected to the adjacent lower roller-shaft by means of a second link $p$. Owing to this link connection the idler $k$ is kept at the proper distance from the idler $i$ and the adjacent cog-wheel upon one of the lower rollers $a$ as the table rises and falls according to the thickness of the material being acted upon, as will be readily understood.

Carried by the table K is an adjustable knife $b$, which extends across the upper face of the table, and this knife is made adjustable by means of a pivoted board $d$, to which the knife $b$ is attached. This adjustment is accomplished by providing the free end of the board $d$ with a transversely-arranged vertically-elongated opening $s$, through which a clamping-rod $n$ passes, said clamping-rod receiving on opposite ends the screw-nuts $r$, abutting against the sides $m$ of the frame and serving to draw them against the adjacent edges of the board $d$ and clamping it in the desired vertical adjustment. By means of the adjustable knife being situated just beyond the farthest feed-roller $a$ the knife can be adjusted to cut close to the skin, and thereby to remove all of the fat therefrom.

For the purpose of cutting the pieces being passed through the machine into strips of any desired width I provide one or more horizontal adjustably-arranged knives $e$, which preferably project downward between the rollers, though they may be situated in some other position without affecting the spirit of my invention. These knives $e$ serve to cut the material passing through the machine into strips of any predetermined or desired width. The knives $e$ are held between the ears $e'$ of a bracket $t$ through the medium of a clamping-screw $e''$. This bracket $t$ is detachably secured to the cross-bar $i$ by means of a screw-bolt $k$, adapted to enter either one of a longitudinally-arranged series of openings $j$, formed in the said bar $i$, whereby the knife or knives, as the case may be, may be readily laterally adjusted upon the bar $i$ for regulating the width of the strip being cut. As the skin with the fat thereon is passed through the machine the corrugated rollers E serve to hold the skin downward upon the table, and the spring-actuated table accommodates itself to the varying thicknesses of the fat, and the knife $c$ severs the fat from the skin, the skin passing outward through the space $f$ between the knife and the adjacent feed-roller $a$ into any desired receptacle placed therefor, while the fat will pass on on top of the table to the end thereof and drop into any receptacle placed there to receive it.

A machine of the character herein described enables me to separate the fat from the skin of hogs in a manner which is very economical and rapid as compared with the method now practiced in packing-houses and enables one man to perform the work of several.

Having thus described my invention, what I claim, and desire to secure by Letters Patent, is—

1. A machine of the character described comprising a frame carrying rollers, a spring-supported table, rollers situated under the said table and projecting therethrough and below the upper rollers, and a knife carried by the table and extending thereacross, the table having an opening in advance of the knife for the passage of the skin, substantially as described.

2. A machine of the character described comprising a frame carrying transversely-extending upper rollers, a spring-supported table having roller-openings, transversely-extending lower feed-rollers situated under the upper rollers and projecting through the openings in the said table, a horizontal knife for removing the fat from the skin, and a vertically-arranged knife or knives for dividing the material into strips, substantially as described.

3. A machine of the character described comprising a frame, upper parallel corrugated rollers carried by the frame and extending transversely thereof, a longitudinally-extending spring-supported table, lower feed-rollers situated under the upper rollers and carried by the said table, the table having openings through which the lower rollers project, a horizontal knife carried by the table, and an operating means for the rollers, substantially as described.

4. A machine of the character described comprising a frame, transversely-arranged feed-rollers, a supporting-table, a horizontally-arranged knife for separating the fat from the skin, and laterally-adjustable vertically-arranged knives for separating the material into strips, substantially as described.

5. A machine of the character described comprising a frame, transversely-arranged feed-rollers, a supporting-table, a horizontally-arranged knife for separating the fat from the skin, and a vertically-arranged knife for separating the material, substantially as described.

In testimony whereof I hereunto affix my signature in the presence of two witnesses.

PHILLIP FEITEN.

Witnesses:
J. H. SALTSMAN,
J. H. SCHNEIDER.